(12) United States Patent  (10) Patent No.: US 6,956,608 B1
Shapiro et al.  (45) Date of Patent: Oct. 18, 2005

(54) FINGERPRINT IMAGING DEVICE INCLUDING AN OPTICAL PLATE HAVING MICROREFLECTORS

(75) Inventors: Yury Shapiro, San Ramon, CA (US); Alexandre Ryabov, St. Petersburg (RU)

(73) Assignee: Identix Incorporated, Minnetonka, MN (US)

( * ) Notice: Subject to any disclaimer, the term of this patent is extended or adjusted under 35 U.S.C. 154(b) by 1066 days.

(21) Appl. No.: 09/637,063

(22) Filed: Aug. 11, 2000

(51) Int. Cl.[7] ............................................. H04N 5/225
(52) U.S. Cl. ................. 348/335; 348/370; 250/227.28; 382/124
(58) Field of Search ................................ 348/335, 336, 348/337, 340, 207.99, 360, 375, 373, 374, 348/370; 382/124, 126, 127; 356/71; 250/227.28, 250/227.31, 227.32

(56) References Cited

U.S. PATENT DOCUMENTS

| | | |
|---|---|---|
| 3,743,421 A | 7/1973 | Maloney |
| 3,781,855 A | 12/1973 | Killen |
| 3,824,951 A | 7/1974 | Le Vantine et al. |
| 3,861,142 A | 1/1975 | Bose |
| 3,864,042 A | 2/1975 | Leventhal |
| 3,873,970 A | 3/1975 | McMahon et al. |
| 3,959,884 A | 6/1976 | Jordan et al. |
| 4,003,656 A | 1/1977 | Leventhal |
| 4,120,585 A | 10/1978 | De Palma et al. |
| 4,258,994 A | 3/1981 | Task |
| 4,311,300 A | 1/1982 | Buerger |
| 4,336,998 A | 6/1982 | Ruell |
| 4,353,056 A | 10/1982 | Tsikos |
| 4,353,856 A | 10/1982 | Mück et al. |
| 4,394,773 A | 7/1983 | Ruell |
| 4,428,670 A | 1/1984 | Ruell et al. |
| 4,429,412 A | 1/1984 | Pierce et al. |
| 4,455,083 A | 6/1984 | Elmes |
| 4,537,484 A | 8/1985 | Fowler et al. |
| 4,553,837 A | 11/1985 | Marcus |
| 4,577,345 A | 3/1986 | Abramov |
| 4,582,985 A | 4/1986 | Löfberg |
| 4,728,186 A | 3/1988 | Eguchi et al. |
| 4,784,484 A | 11/1988 | Jensen |
| 4,785,171 A | 11/1988 | Dowling, Jr. et al. |
| 4,792,226 A | 12/1988 | Fishbine et al. |
| 4,811,408 A | 3/1989 | Goldman |
| 4,811,414 A | 3/1989 | Fishbine et al. |
| 4,872,203 A | 10/1989 | Asai et al. |
| 4,876,725 A | 10/1989 | Tomko |
| 4,917,987 A | 4/1990 | Arndt et al. |
| 4,924,085 A | 5/1990 | Kato |
| 4,925,800 A | 5/1990 | Kovacs et al. |
| 4,932,776 A | 6/1990 | Dowling, Jr. et al. |
| 4,933,976 A | 6/1990 | Fishbine et al. |
| 4,936,680 A | 6/1990 | Henkes et al. |
| 4,944,021 A | 7/1990 | Hoshino et al. |

(Continued)

*Primary Examiner*—Tuan Ho
(74) *Attorney, Agent, or Firm*—Beyer Weaver & Thomas, LLP.

(57) ABSTRACT

A compact-sized fingerprint imaging device includes an optical plate for creating a fingerprint pattern at a finger field on the optical plate. The fingerprint pattern is illuminated with light from an illuminating tool to create imaging light rays. A small thickness of the optical plate, and hence of the fingerprint imaging device, is possible due to a design that includes an array of microreflectors covering a part of the optical plate, the microreflectors being distributed along a base surface. The imaging light rays from the fingerprint pattern that are reflected by the array of microreflectors are received by an imaging lens that projects an image of the fingerprint pattern to an image sensor.

21 Claims, 8 Drawing Sheets

U.S. PATENT DOCUMENTS

| | | |
|---|---|---|
| 4,946,276 A | 8/1990 | Chilcott |
| 4,983,036 A | 1/1991 | Froelich |
| 4,983,846 A | 1/1991 | Rios et al. |
| 4,997,601 A | 3/1991 | Mirinni et al. |
| 5,088,817 A | 2/1992 | Igaki et al. |
| 5,126,882 A | 6/1992 | Oe et al. |
| 5,177,802 A | 1/1993 | Fujimoto et al. |
| 5,210,588 A | 5/1993 | Lee |
| 5,210,797 A | 5/1993 | Usui et al. |
| 5,233,404 A | 8/1993 | Lougheed et al. |
| 5,241,606 A | 8/1993 | Horie |
| 5,283,475 A | 2/1994 | Berger |
| 5,402,324 A | 3/1995 | Yokoyama et al. |
| 5,416,573 A | 5/1995 | Sartor, Jr. |
| 5,448,649 A | 9/1995 | Chen et al. |
| 5,448,659 A | 9/1995 | Tsutsui et al. |
| 5,528,355 A | 6/1996 | Maase et al. |
| 5,596,454 A | 1/1997 | Hebert |
| 5,650,842 A | 7/1997 | Maase |
| 5,689,576 A | 11/1997 | Schneider et al. |
| 5,732,148 A | 3/1998 | Keagy et al. |
| 5,737,439 A | 4/1998 | Lapsley et al. |
| 5,953,441 A | 9/1999 | Setlak |
| 5,986,746 A | 11/1999 | Metz et al. |
| 6,069,969 A | 5/2000 | Keagy et al. |
| 6,175,641 B1 | 1/2001 | Kallo et al. |
| 6,255,641 B1 | 7/2001 | Johnson |
| 6,292,576 B1 | 9/2001 | Brownlee |

FIG. 16
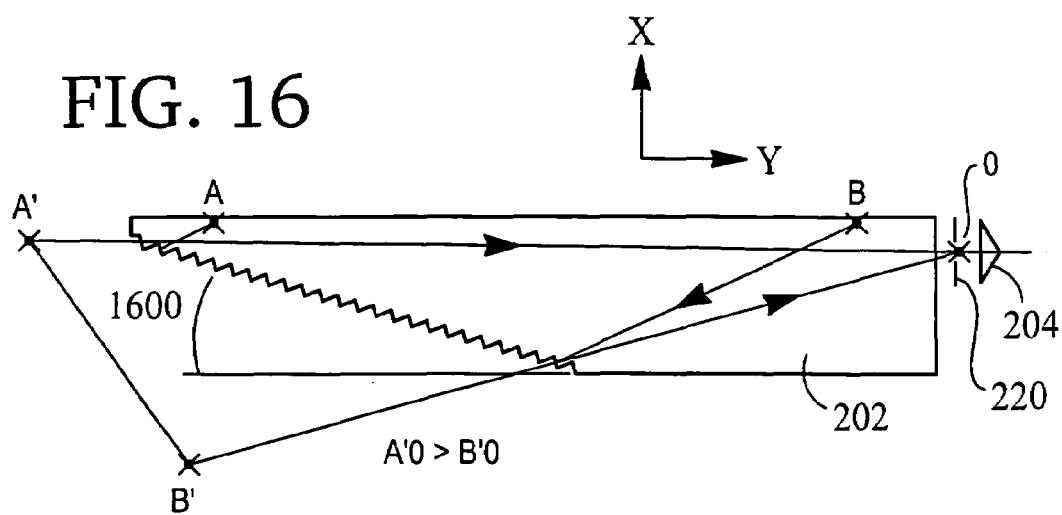
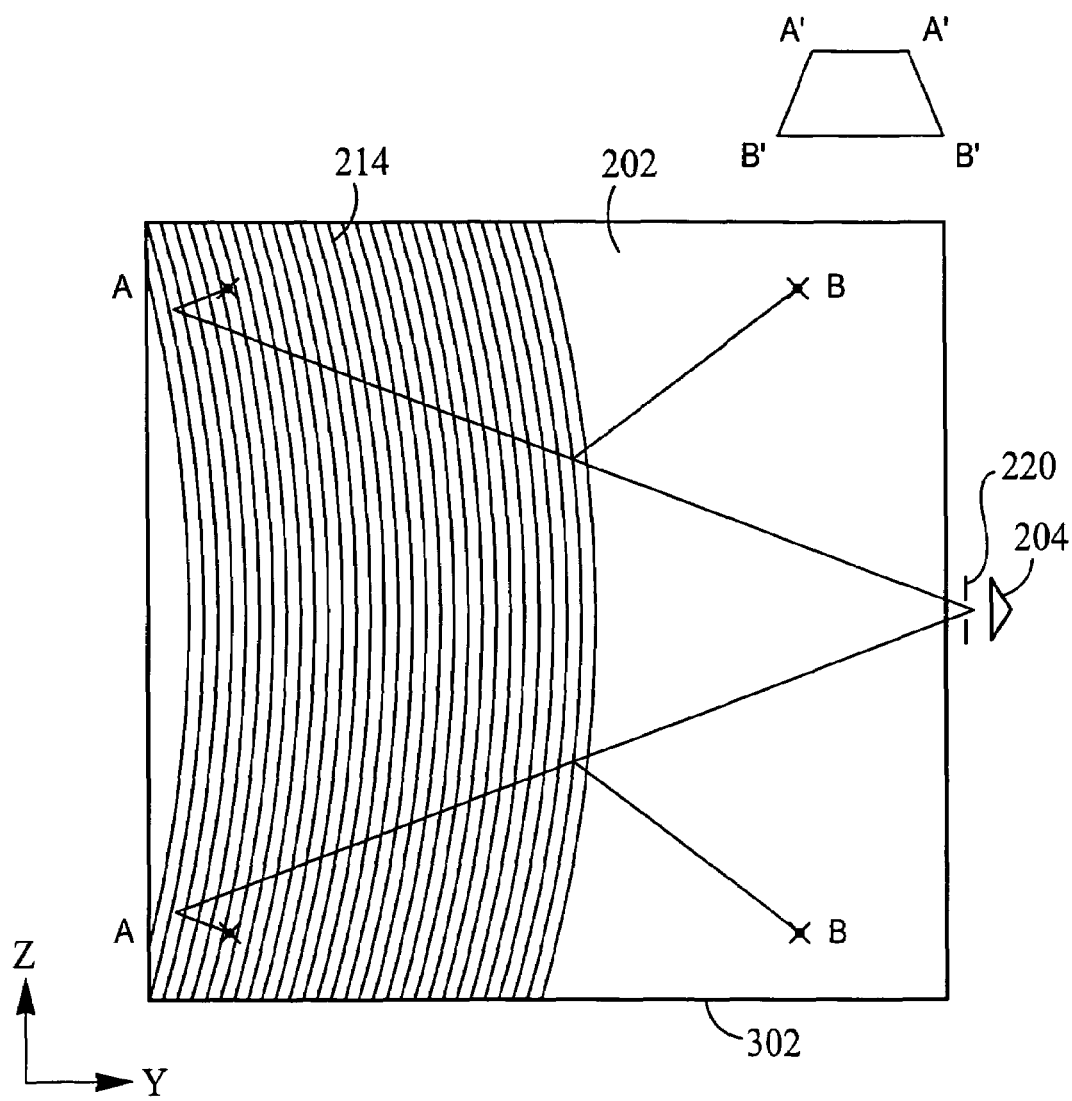
FIG. 17

FINGERPRINT IMAGING DEVICE INCLUDING AN OPTICAL PLATE HAVING MICROREFLECTORS

TECHNICAL FIELD

This invention relates to fingerprint imaging devices for fingerprint matching systems.

BACKGROUND

Up-to-date fingerprint matching systems using fingerprint image transfer into electronic data usually apply the known contact method to create a fingerprint pattern. A surface topography of a finger is approximated by a series of ridges with intermediate valleys. When a finger is applied to a smooth surface of a transparent optical plate or prism, the ridges contact the optical plate while the valleys do not and instead serve to form the boundaries of regions of air and/or moisture.

The finger to be imaged is illuminated by a light source located below or near to the optical plate. Imaging light from the light source is incident on the smooth surface at an angle of incidence measured with respect to a normal to the smooth surface. Imaging light reflected from the smooth surface is detected by an imaging system that usually includes some form of a detector.

Components of a typical fingerprint imaging system are oriented so that an angle of observation (defined to be an angle between an optical axis of the imaging system and the normal to the smooth surface) is greater than a critical angle for the interface between the smooth surface and the air at the smooth surface. The critical angle at the surface/air interface is defined as the smallest angle of incidence for which imaging light striking the surface/air interface is totally internally reflected within the surface. Therefore, the critical angle at the surface/air interface depends on the index of refraction of the air and optical plate. Another constraint for the angle of observation arises because there is incentive to observe the image at the smallest practical angle of observation, as this reduces distortion due to object tilting. Therefore, the angle of observation is typically chosen to be close to, but greater than the critical angle at the surface/air interface.

At locations where the ridges of the finger contact the smooth surface, total internal reflection does not occur because the index of refraction of a finger is larger than that of air. In this case, imaging light incident on the surface of the optical plate at a location where the ridge of the finger contacts the surface is refracted through the surface/finger interface and then partially absorbed and partially diffused upon contact with the finger. In this case, only a small fraction of incident imaging light is reflected back to a detector of the imaging system.

The imaging system may be implemented to produce bright components at valley locations, thus producing a dark or positive fingerprint pattern. In this case, the imaging system detects the imaging light reflected from the surface/air interface. Alternatively, the imaging system may be implemented to produce bright components at ridge locations, thus producing a bright or positive fingerprint pattern. In this case, the imaging system detects a small percentage of the imaging light that is diffused upon contact with the finger.

Fingerprint imaging systems, in versions that produce positive and negative fingerprint patterns, are, for instance, described in U.S. Pat. No. 4,924,085 to Kato et al.; U.S. Pat. No. 5,596,454 to Hebert, and U.S. Pat. No. 5,796,858 to Zhou, et al. The size of the fingerprint imaging systems described in these patents considerably exceeds a size of the finger receiving surface. Furthermore, the fingerprint imaging systems described in these patents are relatively thick, thus making it difficult to use these devices in a compact device.

SUMMARY

A simply constructed compact-sized fingerprint imaging device is provided that includes an optical plate, one or more illuminating tools, and an imaging lens. The optical plate includes a finger field to which a finger is pressed to create the fingerprint pattern. The optical plate also includes an array of microreflectors covering part of the optical plate, the microreflectors being distributed along a base surface.

The one or more illuminating tools illuminate the finger field to create imaging light rays relating to the fingerprint pattern. The imaging lens receives the imaging light rays reflected from the array of microreflectors to create the fingerprint pattern image at a location external to the optical plate. The imaging lens includes an aperture stop that defines an aperture light beam of reflected imaging light rays forming the image of the fingerprint pattern.

The microreflectors are inclined to the base surface so that an area of a projection of the microreflectors on the base surface taken along a path of the imaging light rays reflected at the surface of the microreflectors and passing through the aperture stop exceeds an area of a projection of the microreflectors on the base surface taken along a path of the imaging light rays incident to the surface of the microreflectors and passing through the aperture stop.

The microreflectors may be inclined to the base surface, so that there are gaps between projections of the microreflectors on the base surface along the incident imaging light rays. Those light rays from the fingerprint pattern that strike the gaps are not involved in forming the image. In contrast, projections of the microreflectors on the base surface taken along imaging light rays reflected from the microreflectors may cover a greater area of the base surface, or may cover a complete area of the base surface. This causes the reflected beam of imaging light to be discontinuously contracted compared with the incident imaging light beam, and, accordingly, permits a design of an optical plate that has a reduced thickness.

The microreflector slopes relative to the base surface may vary with a position of the microreflector at the base surface so as to enhance characteristics of the image.

The illuminating tools may be adjusted to illuminate the finger field from directions transverse to the imaging light rays by light passing into the optical plate through its opposite surfaces lateral with respect to the finger field. The illuminating tools may be mounted such that they do not protrude beyond the boundaries of the optical plate in height and such that the total thickness of the device is determined by a thickness of the optical plate.

A thickness of the optical plate of less than about 3 mm may be achieved when the base surface is inclined to the finger field by an angle ranging from about 20 to about 30 degrees.

The microreflectors may include slopes of V-shaped grooves extended transversely to the imaging light rays and facing the imaging lens. The microreflectors may be distributed over the base surface with a regular spacing.

A minimum value of the microreflector spacing may provide a greater optical path length difference between rays of the aperture light beam reflected by the different microreflectors than a coherence interval of light, which is radiated by conventional illuminating tools such as light-emitting diodes.

Resolution of the fingerprint imaging device depends on the number of microreflectors involved in reflection of an aperture light beam of imaging rays forming an image of a point of the fingerprint pattern. If the spacing or period of the microreflectors is changed with the dimension of the aperture light beam on the base surface such that the number of microreflectors is kept constant, then the resolution remains substantially constant. Therefore, to provide uniform resolution across the fingerprint image, the number of microreflectors may be changed proportionally to the microreflector distance from the finger field along the imaging light rays. An improved resolution is provided when the aperture light beam cross section covers two microreflectors independently of the microreflector position on the base surface.

Moderate geometrical distortion in the fingerprint imaging device may be corrected by forming the grooves along concentric circles so as to provide a conical shape of the microreflectors convex or concave to the imaging lens.

Aspects of the techniques and systems can include one or more of the following advantages. The optical plate and corresponding fingerprint imaging device may be reduced in size because an array of microreflectors is used in the device to capture the imaging light rays from the fingerprint pattern. For example, the fingerprint imaging device, because of its compact size, may be used in portable and/or compact electronic devices, such as, for example, computer notebooks, personal digital assistants, and cellular or land-based telephones. Moreover, because the components of the fingerprint imaging device are relatively inexpensive to produce and assemble, the fingerprint imaging device is inexpensive to make.

The details of one or more embodiments are set forth in the accompanying drawings and the description below. Other features, objects, and advantages will be apparent from the description and drawings, and from the claims.

DESCRIPTION OF DRAWINGS

FIGS. 12–17 are side and top views of the fingerprint imaging device of FIG. 2, in which perspective distortions are reduced.

Like reference symbols in the various drawings indicate like elements.

DETAILED DESCRIPTION

In the past, there has not been a need for compact fingerprint imaging devices because fingerprint imaging devices were traditionally used in the fingerprint matching systems used in the field of criminology. However, because there are advantages to using the fingerprint as an identifier, which cannot be forgotten or lost, the field of application for fingerprint imaging devices is constantly expanding. For example, a fingerprint may be used as an access key to resources of different portable personal electronic apparatus. Thus, it becomes beneficial to miniaturize the fingerprint imaging device for use with such portable apparatus.

A fingerprint imaging device with a compact configuration may be implemented in a mass-produced apparatus, such as the portable electronic apparatus. Examples of portable electronic apparatus include cellular telephones, personal computers such as notebooks, and personal digital assistants. For economic reasons, it is important that a fingerprint imaging device may be built into the portable electronic apparatus with substantially no changes in the design of those apparatus. This requirement may be met by a flat configuration of the fingerprint imaging device.

Figure 1:
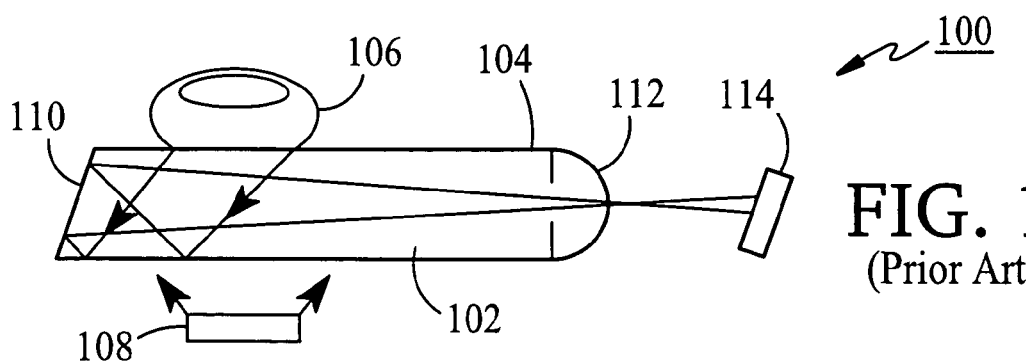
FIG. 1 shows a fingerprint imaging device known in the art.

Referring to FIG. 1, a fingerprint imaging device 100 includes a transparent optical body 102 having a finger contact surface 104 to which a finger 106 is pressed to produce a fingerprint pattern formed by regions of contact of finger skin ridges with the finger contact surface 104 of the optical body 102. An illuminating tool 108 illuminates the finger contact surface 104 to reveal a fingerprint pattern with imaging light rays traveling from the finger contact surface 104 at total internal reflection angles of the optical body 102.

The fingerprint imaging device 100 includes a mirror 110 placed on a lateral surface of the optical body 102. Flat configuration of the optic system is possible because imaging light rays are forwarded from the finger contact surface 104 of the optical body 102 to an imaging lens 112 using the mirror 110. The imaging lens 112 creates an image of the fingerprint at an image sensing device 114.

Dimensions of the mirror 110, and hence the thickness of the optical body 102 in a direction perpendicular to the finger contact surface 104, may not be arbitrarily reduced because of the requirement to reflect imaging light rays from all points of the fingerprint pattern at the finger contact surface 104. Therefore, the dimensions of the fingerprint pattern fragment to be imaged must be sufficient for reliable identification of the person. In other words, the finger contact surface 104 must have dimensions sufficient for a minimum required number of ridge comparisons. It is conventionally held that the fingerprint dimensions should not be less than about 16 millimeters (mm) in both dimensions.

Thus, the thickness of the fingerprint imaging device 100 could not be made less than a cross-section dimension of a beam of the imaging light rays traveling from the fingerprint pattern.

Figure 2:
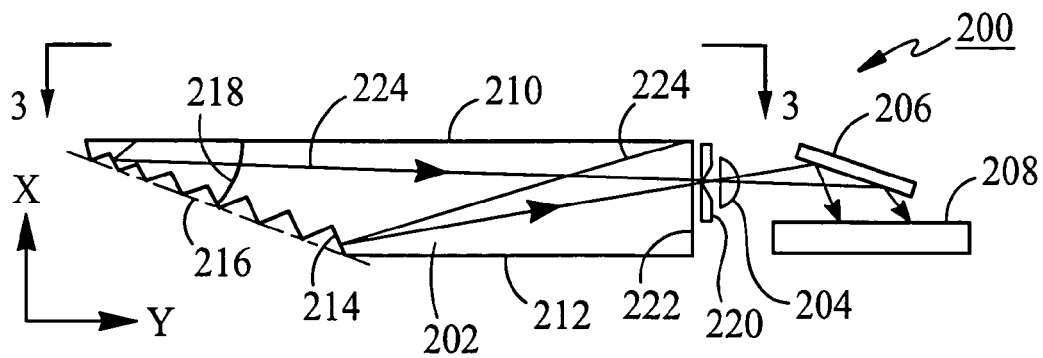
FIG. 2 shows schematically a side sectional view of the fingerprint imaging device according to the present invention.

Referring to FIG. 2, a compact fingerprint imaging device 200 includes an optical plate 202, an imaging lens 204, a mirror 206, an image sensor 208, and one or more illuminating tools (not shown in FIG. 2). For further reference, directions X and Y of the orthogonal coordinate system are shown by arrows. A third direction Z of this orthogonal coordinate system is perpendicular to the drawing plane of FIG. 2.

The optical plate 202 is made of, for example, acrylic plastic. The optical plate 202 includes a finger field 210 located on its top. The finger to be identified is applied to the finger field 210. The finger field 210 has an optically smooth surface to provide good contact with the finger skin ridges. Finger field regions that interface between the optical plate 202 and finger skin ridges form the fingerprint pattern. The finger field 210 has dimensions sufficient for reliable identification of the fingerprint pattern. In other words, the finger field 210 has dimensions sufficient to include the minimum required number of ridge comparisons, which may range anywhere from about 8 to about 16 comparisons. The surface of the finger field 210 is about 18 mm in length and about 18 mm in width.

The mirror 206 may be any mirror coated to reflect light of a wavelength produced by the one or more illuminating tools. The image sensor 208 may be a single crystal CMOS image sensor, produced by Motorola Co., Inc. Or, the image sensor may be a conventional array CCD.

The optical plate 202 also includes a bottom surface 212 parallel to the finger field 210, and an array of microreflectors 214 distributed along a base surface 216 inclined to the finger field 210.

In FIG. 2, the finger field 210 and the base surface 216 are planar in shape. Other shapes are possible for either or both of these surfaces, such as, for example, cylindrical shapes, to enhance various characteristics of the fingerprint image.

The base surface 216 is inclined to the finger field 210 at an angle 218, as shown in FIG. 2. The preferred value of angle 218 ranges from about 20 to about 30 degrees.

If either or both of the surfaces 210, 216 are non-planar, then a corresponding inclination between them may be defined by a difference of distances to the finger field 210 from the edges of the base surface 216 that are farthest and nearest to the finger field 210. This difference may range from about 30 to about 50 percent of the distance between these edges.

The microreflectors 214 are formed of V-shaped grooves, with the open side of the grooves facing the imaging lens 204. The profile of the grooves is shown in FIG. 2 scaled-up relative other parts of the device for better illustration. The grooves extend along the Z-direction. The surface of the microreflectors 214 typically has a reflecting coating, which, for example, may be a deposited layer of aluminum. The reflecting coating may be any reflecting coating used in traditional fingerprint imaging devices.

The imaging lens 204 has an aperture stop 220 that is positioned external to the optical plate 202 and behind its lateral surface 222. The aperture stop 220 defines an aperture light beam of imaging light rays forming the image of a fingerprint pattern point.

The imaging lens 204 creates the image of the fingerprint pattern of the imaging light rays reflected from the array of microreflectors 214. The directions of propagation of imaging light rays in the fingerprint imaging device are shown at FIG. 2 by lines 224. The mirror 206 serves to reflect imaging light rays passed through the imaging lens 204 to the image sensor 208, so that the image sensor 208 is positioned in the plane of the optical plate 202 and does not increase the overall height of the fingerprint imaging device 200 in the X-direction.

Figure 3:
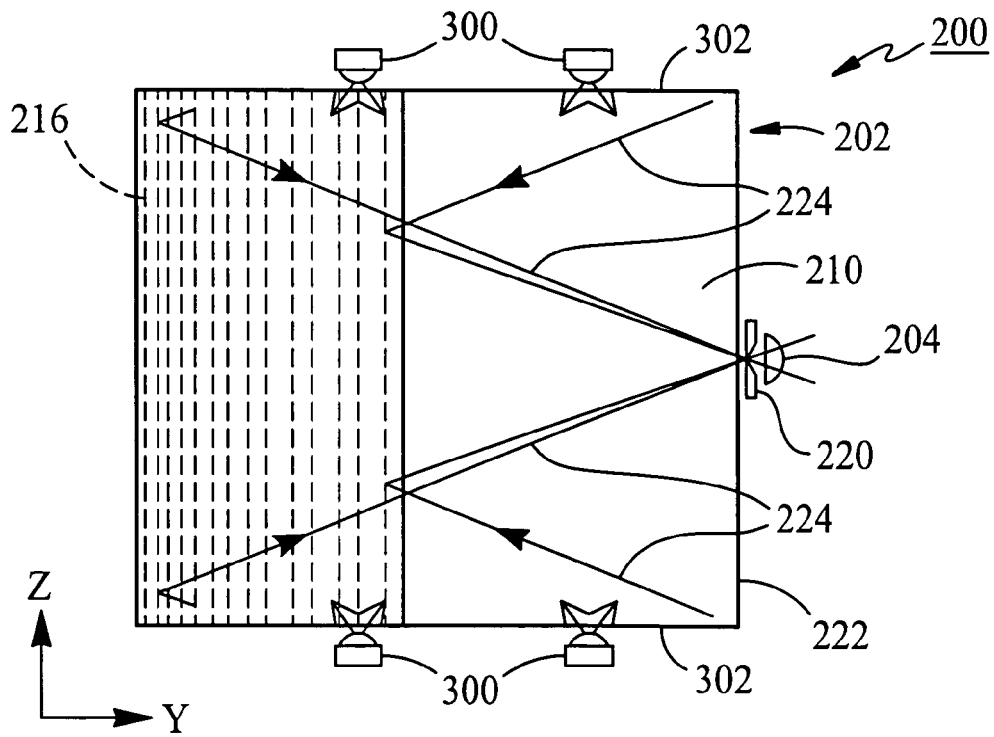
FIG. 3 is a top view of the fingerprint imaging device taken along the line 3—3 of FIG. 2.

Referring also to FIG. 3, the fingerprint imaging device 200 includes illuminating tools 300 that are arranged and operated to illuminate the finger field 210. The illuminating tools 300 may be radiation sources that illuminate the finger field 210 from two opposite directions through lateral surfaces 302 of the optical plate 202. The illuminating tools 300 are represented by conventional light-emitting diodes irradiating in the red spectral region, with a radiation spectral width of approximately 50 nm.

The illuminating tools 300 emit radiation evenly. However, inside the optical plate 202, a refracted light beam from each radiation source 300 propagates within the limits of an associated restricted solid angle of about 80 degrees in cross-section. Light from the illuminating tools 300 that is totally internally reflected inside the optical plate 202 is not involved in the fingerprint pattern imaging.

Dimensions of the fingerprint imaging device 200 in the Z-Y plane are close to the limit imposed by the requirements of the minimum dimensions of the finger field 210.

When a finger is applied to the finger field 210, in the regions of its surface having the boundaries with ridges, the total internal reflection conditions are not met for light from the illuminating tools 300. Imaging light rays penetrate through the surface of the finger field 210 and illuminate the finger skin on its ridges in these regions. Imaging light rays scattered from ridges pass back in the optical plate 202 in accordance with the refraction law at angles to the normal of the surface not exceeding the critical total internal reflection angle at the interface with the ridges. These imaging light rays create a negative fingerprint pattern formed by the bright regions corresponding to the ridges of the finger skin because the valleys of the finger skin produce a dark background.

The illuminating tools 300 are mounted along the lateral surfaces 302 of the optical plate 202 as shown in FIG. 3. The illuminating tools 300 are positioned so as not to protrude beyond a height of the optical plate along the X direction. Thus, the height of the fingerprint imaging device 200 in the X direction is determined by the thickness of the optical plate 202.

Figure 4:
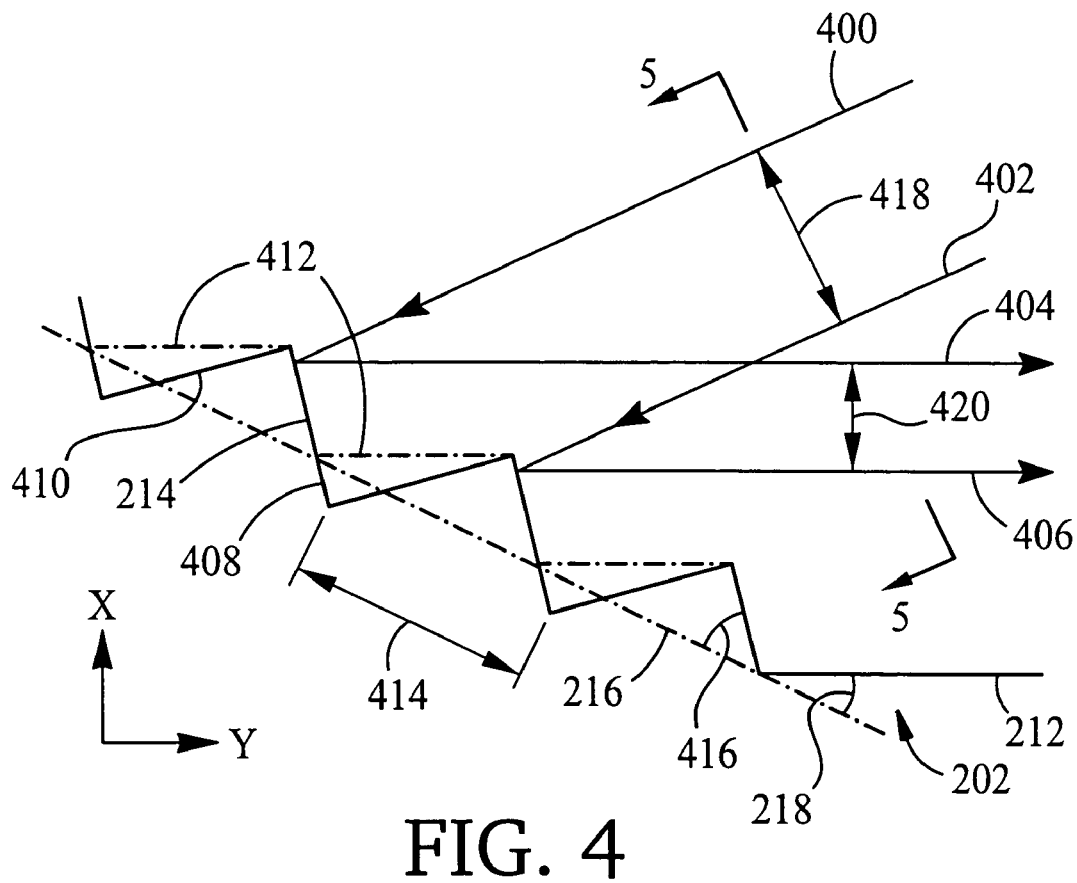
FIG. 4 is a side sectional view of a scaled-up fragment of an array of microreflectors in the device shown in the FIG. 2.
Figure 5:
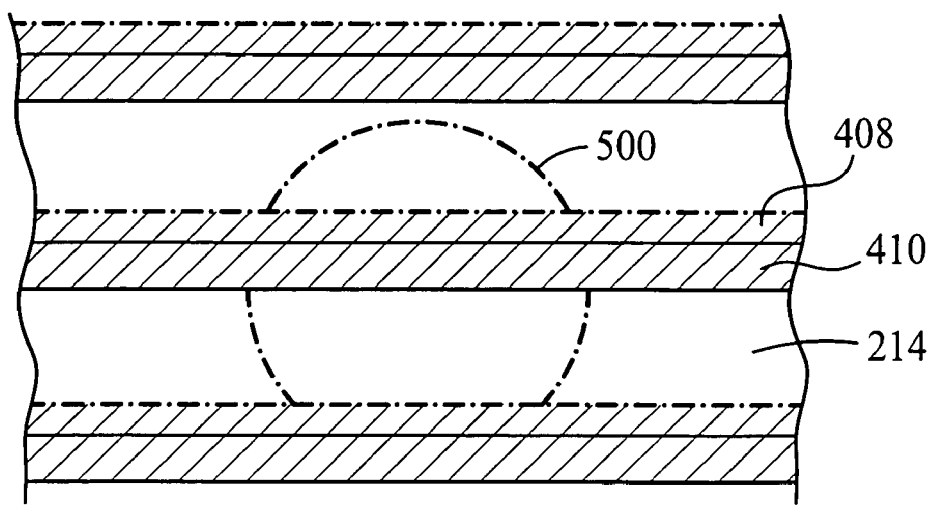
FIG. 5 is a view of a region of the array of microreflectors taken along the line 5—5 of FIG. 4.

Referring also to FIGS. 4 and 5, details relating to the array of the microreflectors 214 and the characteristics of the imaging light rays will now be described.

The lines 400 and 402 represent the incident imaging light rays coming from the fingerprint pattern and impinging on the adjacent microreflectors 214. Imaging light rays 404, 406, corresponding to the incident rays 400, 402, respectively, are reflected from the microreflectors 214. The reflected imaging light rays 404, 406 pass through the center of the aperture stop 220 to form the aperture light beam.

As shown in FIG. 4, the surface of the microreflectors 214, which reflect imaging light rays, are those portions of the surfaces of the groove slopes for which incident imaging light rays are reflected and reach the aperture stop 220. The incident rays from the fingerprint pattern on portions 408 of the slopes are not reflected into the imaging lens 204 but are instead blocked by surfaces 410. Dotted lines 412 parallel to the reflected light rays 404, 406 define this boundary between the portions 408 and the corresponding microreflectors 214.

The microreflectors 214 are distributed with a spacing 414 along the base surface designated by line 216. In the implementation shown in FIG. 4, a width of the groove is equal to the spacing 414 of the microreflectors 214. In another implementation, the grooves may be spaced apart resulting, in this case, in the microreflector spacing exceeding the groove width.

For economical reasons, device materials such as acrylic plastics or polystyrene are used for the optical plate 202. In this case, the grooves on the surface of a die used to manufacture the optical plate 202 may be formed using a fabrication process similar to that employed in making diffraction gratings, which would provide the required optical quality of the surfaces of the microreflectors 214.

The microreflectors 214 subtend an angle 416 with the base surface 216. The base surface 216 is inclined to a surface, which is parallel to the finger field 210, at the angle 218.

Reflection from mirror 110 as in the fingerprint imaging device 100 shown in FIG. 1 does not change an area of the fingerprint image captured by the image sensor 114. Thus, all of the imaging light rays incident on the mirror 110 are used to reproduce the fingerprint image at the image sensor 114. In contrast, the microreflectors 214 used in the fingerprint imaging device 200 serve to contract, in a discontinuous manner, the aperture light beam, that is, change the area of the fingerprint image captured by image sensor 208 because many of the light rays incident to the base surface 216 are excluded from the fingerprint image reproduction at the image sensor 208. Thus, the cross section of imaging light rays incident to the microreflectors 214 and at the surface of the microreflectors 214 is discontinuously larger than the cross section of the light rays reflected from the microreflectors 214 and at the surface of the microreflectors 214.

FIG. 4 illustrates this aperture light beam contraction by showing the relationship between the spacing of the incident light rays 400 and 402, marked by reference number 418, and the spacing of the reflected light rays 404, 406, marked by reference number 420. In general, imaging light rays that reach the aperture stop 220 are converging. However, for the purpose of illustration, imaging light rays 400–406 appear parallel. Those incident rays that fall within the spaces 408, 410 of the microreflectors 214 are excluded from the formation of the fingerprint image captured by image sensor 208. The spaces 408, 410 are shown as hatched areas in FIG. 5.

Figure 6:
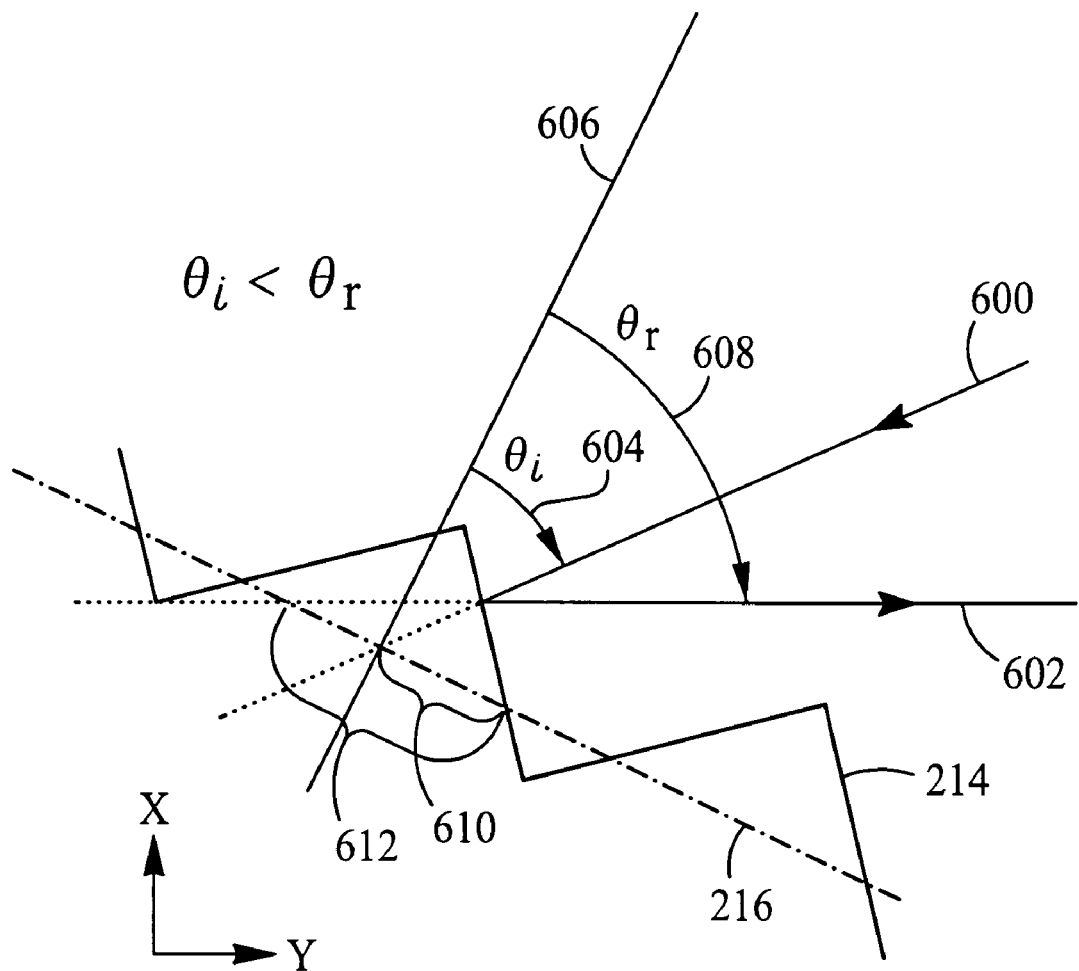
FIG. 6 is a side sectional view of a scaled-up fragment of the array of microreflectors in the device shown in FIG. 2.

Referring also to FIG. 6, the aperture light beam contraction, or exclusion of light rays from the fingerprint image capture by image sensor 208, may be illustrated by incident imaging light ray 600 and reflected imaging light ray 602. An angle $\theta_i$ 604 between the incident imaging light ray 600 and a normal 606 to the base surface 216 is less than an angle $\theta_r$ 608 between the reflected imaging light ray 602 and the normal 606 to the base surface 216. In the prior fingerprint imaging device 100 these angles may be measured with respect to the mirror 110—in that case, the angles are equal because the mirror 110 is flat. Thus, all of the incident imaging light rays become reflected imaging light rays in the fingerprint imaging device 100.

The relationship between the light rays incident to the microreflectors 214 and reflected from the microreflectors 214 may be expressed with respect to projections, as shown in FIG. 6. The projection of a microreflector 214 onto the base surface 216 taken along the direction of the imaging light ray 600 incident to the microreflector 214 is shown by the length 610. The projection of a microreflector 214 onto the base surface 216 taken along the direction of the imaging light ray 602 reflected from the microreflector 214 is shown by the length 612. Thus, in general, a total area of the projection of the microreflectors onto the base surface taken along the direction of imaging light rays reflected from the microreflector exceeds a total area of the projection of the microreflectors onto the base surface taken along the direction of imaging light rays incident to the microreflectors.

Therefore, the aperture light beam contraction due to the microreflectors of the fingerprint imaging device 200 of FIGS. 2–6 permits use of a thinner optical plate than that in a fingerprint imaging device with an ordinary continuous mirror, such as the fingerprint imaging device 100 of FIG. 1.

The aperture light beam contraction may be characterized by a ratio of the spacing 414 to the length of the projection of the microreflector 214 onto the base surface 216, along the axis of the incident beam.

As mentioned above, the aperture light beam contraction may be characterized by a ratio of microreflector projection areas. The ratio is given by: $A_I/A_R$, where $A_R$ is the total area of the microreflectors 214 projected on the base surface 216 along the path of the reflected imaging light rays that pass through the center of the aperture stop 220, and $A_I$ is the area of the microreflectors 214 projected on the base surface 216 along the incident imaging light rays that form reflected imaging light rays that pass through the center of the aperture stop 220. Thus, $A_I/A_R$ should be less than 1.

In one embodiment, the base surface 216 is entirely covered by projections of the microreflectors 214 along the path of the reflected imaging light rays. When this condition is met, the cross section of the reflected beam decreases with the angle 218 formed by the base surface 216 and the finger field 210. As the angle 218 in the beam of the incident light rays on the array of microreflectors 214 decreases, the proportion of the imaging light rays that are reflected to the imaging lens 204 is reduced, and, accordingly, the brightness of the image is also reduced.

With values of angle 218 ranging between about 20 to about 30 degrees, the spacing 414 is approximately twice the width of the projection of the microreflector 214 to the base surface 202 along the path of the incident light rays. With these conditions, and if the surface of the finger field 210 is about 18 mm in length and about 18 mm in width, the optical plate 202 may be designed to be no more than 3 mm thick (as measured along the X-direction).

In accordance with the method of producing the fingerprint pattern that may be observed within a range of angles for total internal reflection, the axis of the imaging light beam is inclined with respect to the finger field 210 on which the fingerprint pattern is found. The image of an object sloping towards the axis of the optical system is subject to geometrical distortion.

As will be seen from comparison between the path lengths of the imaging light rays 224 in FIG. 2, the optical system of the fingerprint imaging device 200 is designed to correct the perspective component of the geometrical distortion of the image. The perspective distortion caused by the greater path length of the imaging light rays traveling from that edge of the finger field 210 nearest to the imaging lens 204, as compared to the edge farthest from the imaging lens 204, is relatively small, provided the angles formed by the finger field 210 and the base surface 216 lie within the above range of about 20 to about 30 degrees.

To correct image distortion of the fingerprint pattern scale along the Y-direction, the angle 416 of inclination of the microreflectors 214 to the base surface 216 (and accordingly the angle 218) may be varied. The angle 416 of inclination of the microreflectors 214 to the base surface 216 may vary from microreflector to microreflector or it may vary with the position of the microreflector.

The resolution of the fingerprint imaging device 200 in the Z direction is determined by the resolution of the imaging lens 204. The resolution of the fingerprint imaging device 200 in the Y direction is dependent on the relationship between the spacing 414 of the microreflectors 214 and the cross-sectional dimensions of the aperture light beam at the base surface 216.

FIG. 5 shows a portion of the base surface 216 as viewed from the aperture stop 220 along the path of the aperture light beam. The microreflectors 214 are separated by spaces not involved in the reflection of the imaging light rays, the spaces being schematically represented as hatched areas 408, 410. These spaces include the surfaces 410 and the portions 408 of the groove slopes that are screened from the imaging lens 204. Line 500 marks the boundary of the aperture light beam on the surfaces of the microreflectors 214.

If the spacing of the microreflectors 214 and the dimensions of the cross-section of the aperture light beam of the base surface 216 are related in such a way as is shown in FIG. 5, so that light rays of the aperture light beam are reflected by more than one microreflector 214, and the spacing 414 of the microreflectors 214 is sufficiently large for the parts of a single aperture light ray reflected by different microreflectors 214 to be incoherent, these parts each form, independently, the image of a fingerprint pattern point. The diffraction limit of resolution of the optical device along the Y-direction is inversely proportional to the number of microreflectors 214 reflecting the light rays of a single aperture light beam. The interference between parts of an aperture light beam reflected by different microreflectors 214 leads to an additional degradation of the fingerprint imaging device resolution, so that an arrangement of microreflectors in an array with a relatively small spacing 414 is inexpedient.

To obtain a high quality fingerprint image, the cross-sectional dimension of the aperture light beam at the base surface 216, transversely to the microreflectors 214, should be approximately twice the spacing 414 of the microreflectors 214. In this case, the structure of the array of microreflectors 214 may not reveal itself in brightness modulation of the image, and degradation of the fingerprint imaging device resolution along the Y-direction, as compared to the resolution along the X-direction, is negligible.

The cross-sectional dimensions of the aperture light beam at the base surface 216 are proportional to the distance along its axis from the base surface 216 to the finger field 210. To provide a uniform resolution over the image field, the microreflectors 214 may be arranged with a variable spacing 414 along the base surface 216, which is proportional to the distance from them to the finger field 210 along the imaging light rays.

In this case, the spacing 414 of the microreflectors 214 is changed linearly ranging from about 0.05 mm near the finger field 210 to about 0.3 mm at the surface 212. With such variable spacing, the difference between the optical path lengths for the rays reflected by adjacent microreflectors 214 is in excess of the coherence interval of the imaging light rays, which is determined by the spectral width of light radiated by the illuminating tools 300. With a spectral width of about 50 nm, which is characteristic of conventional light emitting diodes, the coherence interval is about 0.015 mm. Thus, the imaging light rays reflected by different microreflectors 214 are substantially incoherent. The coherence interval of light radiated from the illuminating tool 300 may be less than the optical path length difference between parts of the aperture light beam reflected from different microreflectors.

Figure 7:
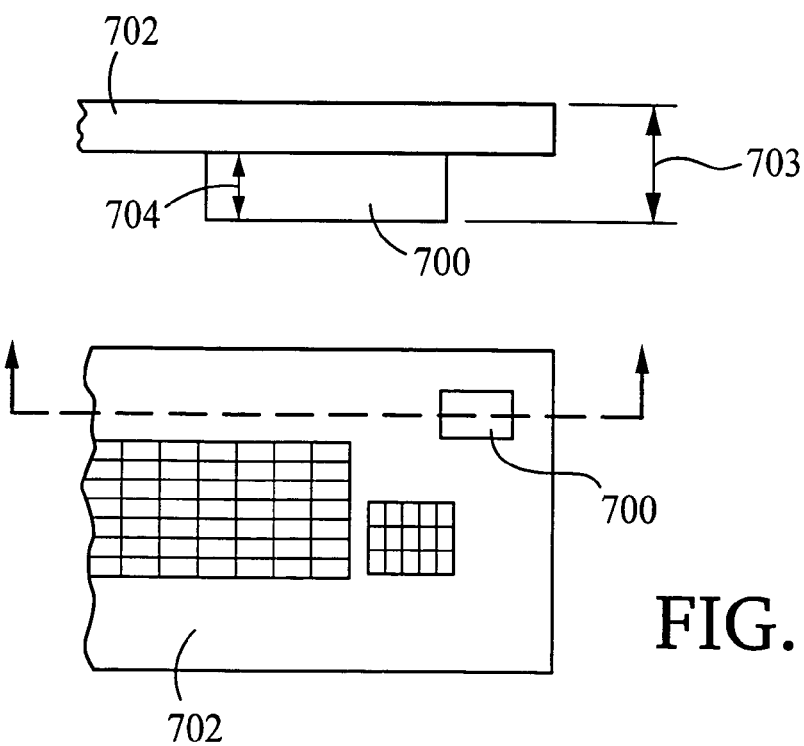
FIG. 7 shows a fingerprint imaging device implemented in an electronic apparatus.

Referring also to FIG. 7, a simply constructed compact fingerprint imaging device 700 may be implemented in an electronic apparatus 702 such as pc cards and laptops in which an overall width is a design consideration. In prior designs, the fingerprint imaging device is placed below and within the housing of the electronic apparatus, as shown in FIG. 7. In this design, the overall width is indicated by 703. Because the fingerprint imaging device is below the housing, the housing of the electronic apparatus interferes with operation of the fingerprint imaging device. Additionally, the housing must be large enough to accommodate the fingerprint imaging device. One way to reduce the size of the electronic apparatus is to reduce the size (in particular, the thickness 704) of the device 700. However, this is not a practical solution today because of the costs associated with a smaller device 700. Moreover, this still does not address the issue of interference between the device 700 and the housing of the apparatus 702.

Figure 8A:
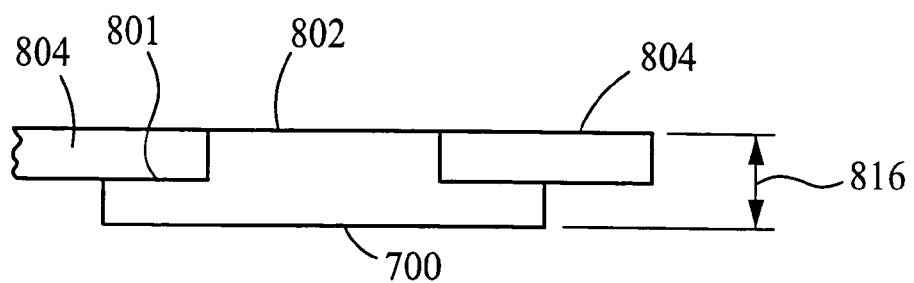
FIGS. 8A and 8B show a fingerprint imaging device implemented in an electronic apparatus according to the present invention.
Figure 8B:
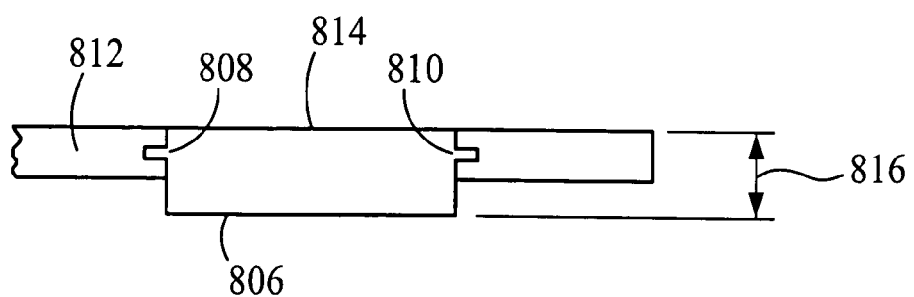

As shown in FIGS. 8A and 8B, to solve these problems, a fingerprint imaging device 800 may be accommodated within the housing surface. In the design of FIG. 8A, device 800 includes a step 801 that permits the finger field 802 to lie flush with the outer surface of housing 804. In the design of FIG. 8B, a fingerprint imaging device 806 includes a ridge (or tab) 808, which serves the same purpose as the step of FIG. 8A, and which fits into a recess 810 designed into the housing 812. The finger field 814 and housing 812 are flush.

In both of these designs, as noted, the finger field lies flush with the housing. Moreover, because the fingerprint imaging device is partially accommodated in the housing surface, an overall width 816 of the electronic apparatus is reduced relative to the electronic apparatus width.

Figure 9:
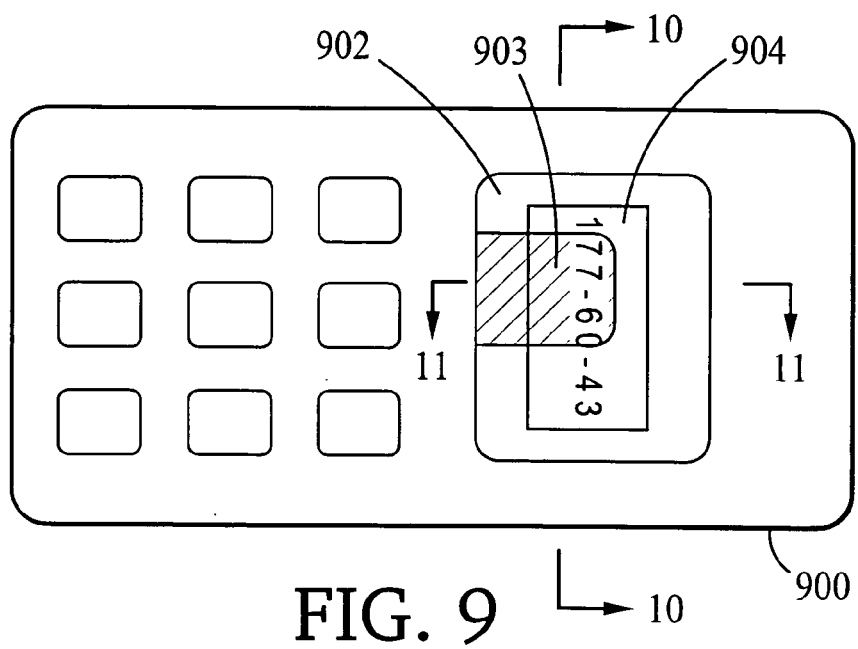
FIG. 9 is a top view of an electronic apparatus that includes an indicator surface.
Figure 10:
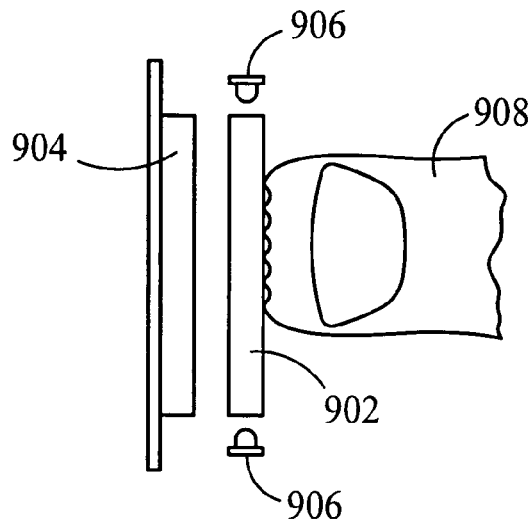
FIGS. 10 and 11 are cross-sectional views of the electronic apparatus of FIG. 9.
Figure 11:
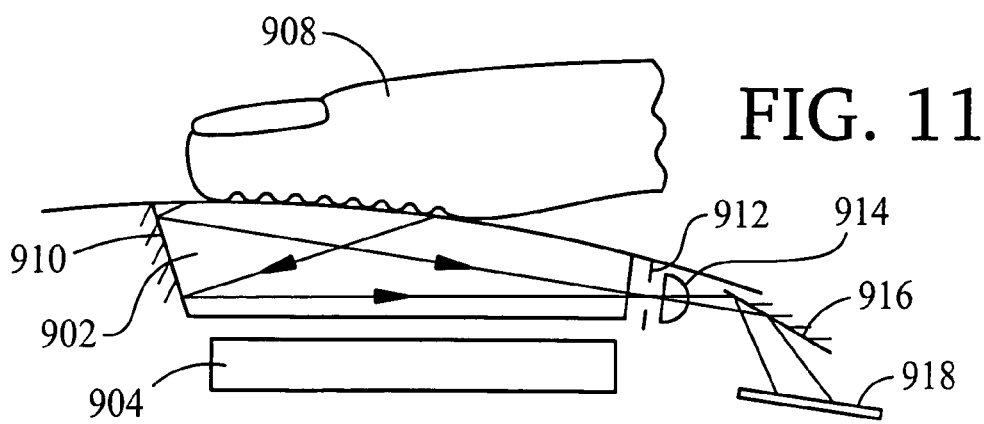
Figure 12:
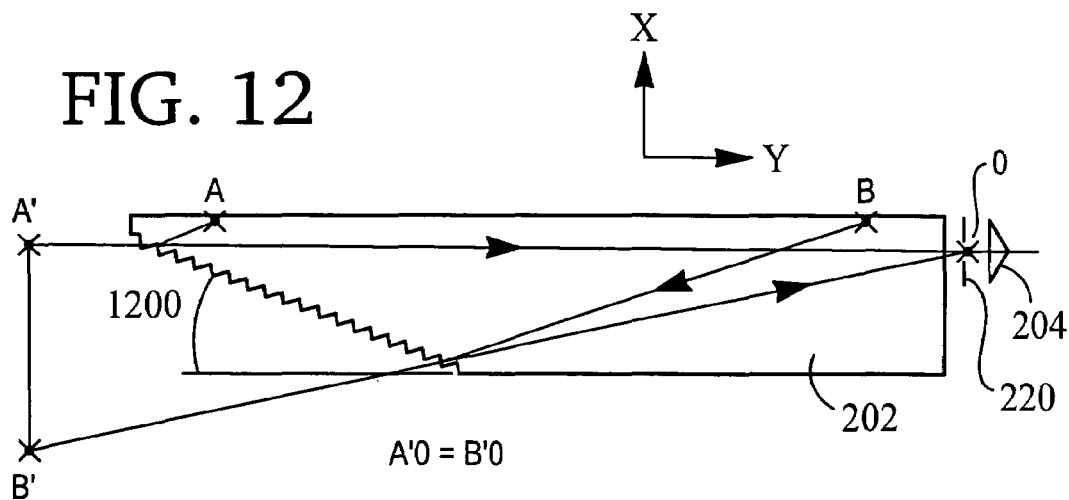

Referring also to FIGS. 9–11, a fingerprint imaging device may be implemented in an electronic apparatus 900 as an optical plate 902 formed into an indicator panel 904. The electronic apparatus 900 may be a portable device such as a cell phone, personal computer, or a remote control unit. The fingerprint imaging device is used to restrict access to such device.

The optical plate 902 functions as both a fingerprint platen and as a cover glass 903 for the indicator panel 904. The bottom surface of the optical plate 902 is transparent and does not impede observation of the underlying indicator panel 904. One or more illuminators 906 are positioned along a lateral side of the optical plate to illuminate the finger 908. Light dispersed from the ridges of the finger 908 and a portion of the light dispersed after reflection from a spherical mirror 910 is directed through an aperture 912 and lens 914, reflected from a mirror 916, and imaged onto an imager 918.

If there is no finger present on the optical plate 902, then light from the illuminators 906 does not reach the imager 918 because of the placement of the imager 918 relative to the placement of the illuminators 906. Additionally, light from external sources does not reach the imager 918 because the lens 914 receives light spreading at angles greater than the critical internal reflection angle of the optical plate 902.

An area of the surface of the cover glass 903 is approximately 16 mm×16 mm. A thickness of the optical plate 902 is approximately 4 mm at its thickest part and an area of the surface of the optical plate 902 is approximately 30 mm×36 mm. In one implementation, the illuminators are red light diodes that emit light at a wavelength of approximately 0.66 $\mu$m. The imager 918 may be a CMOS Motorola camera or a CCD.

A number of implementations have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

For example, in contrast to the arrangement of FIG. 3, the illuminating tools 300 in the fingerprint imaging device 200 may be placed behind the surface 222 and on either or both sides of the aperture stop 220 to create a positive fingerprint pattern. In this case, the illuminating tools 300 may be extended radiation sources having even brightness.

Another possible embodiment of the fingerprint imaging device is that in which the base surface is located parallel to the finger field.

Referring also to FIGS. 12–17, image distortion of the fingerprint pattern scale may occur along the Y-direction. This image distortion depends on an angle $\phi_Y$ that defines the inclination of the base surface 216 to the Y-direction. For illustration, in FIGS. 12–17, imaging light rays reflected from the finger contact surface 104 at points A and B are traced. Additionally, imaging light rays pass through a point 0 of the aperture stop 220. A image of the fingerprint image is represented by the segment A'B', corresponding to the segment AB.

Figure 13:
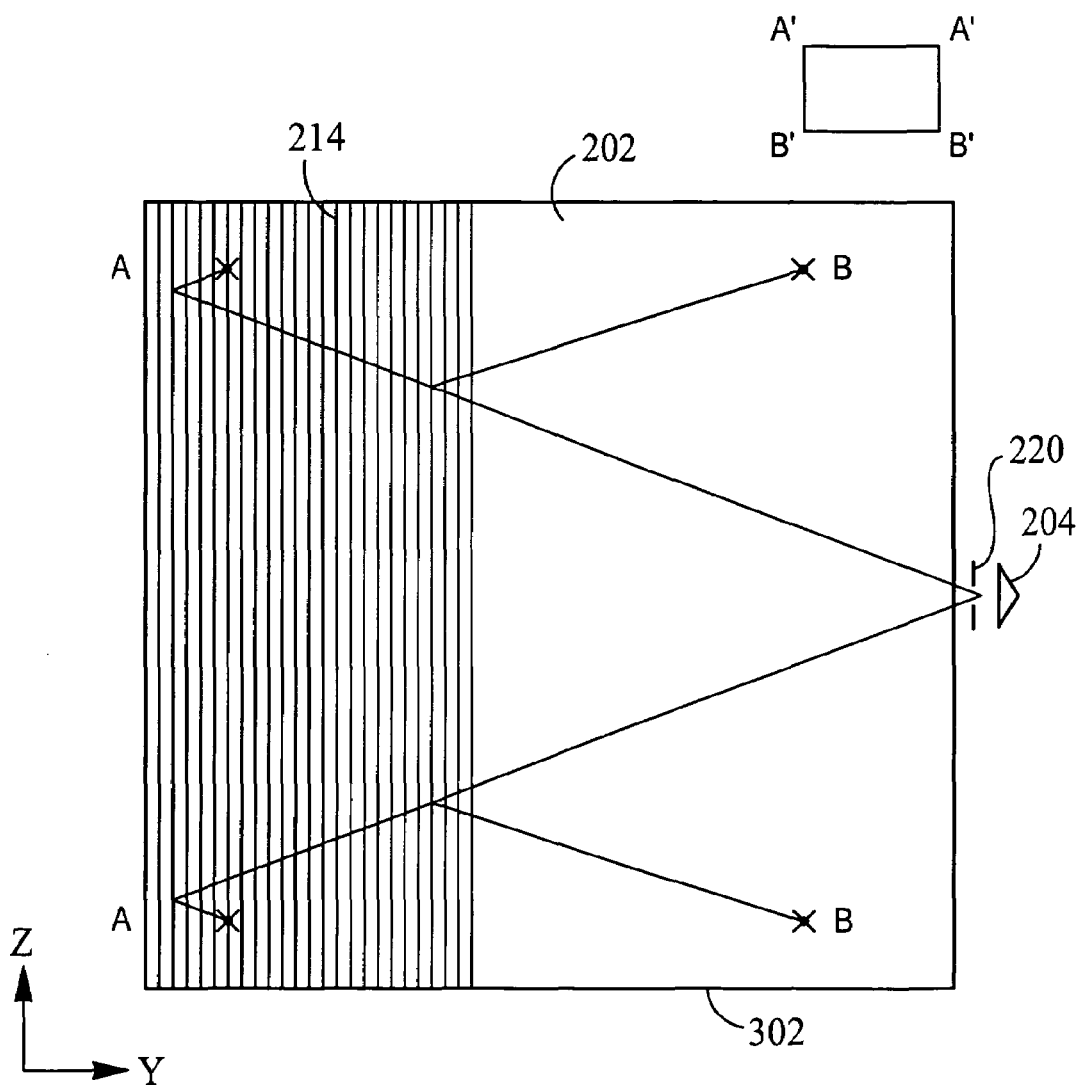

When the angle $\phi_Y$ (as indicated by reference number 1200 in FIG. 12) is such that image A'B' is parallel with the X-direction, then no image distortions emerge. In this case, the microreflectors 214 are linear along the Z-direction, as shown in FIGS. 3 and 13.

When the angle $\phi_Y$ (as indicated by reference number 1400 in FIG. 14) is such that the image A'B' is tilted in a manner such that the segment A'O is less than the segment B'O, then residual perspective distortions arise. To compensate for these distortions, the microreflectors 214 are designed in a concave arrangement relative to the imaging lens, as shown in FIG. 15.

Figure 14:
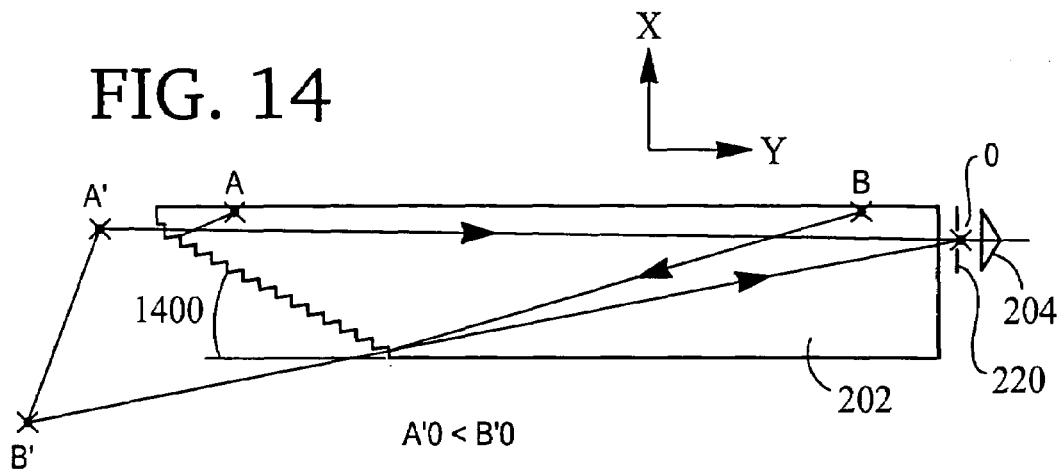
Figure 15:
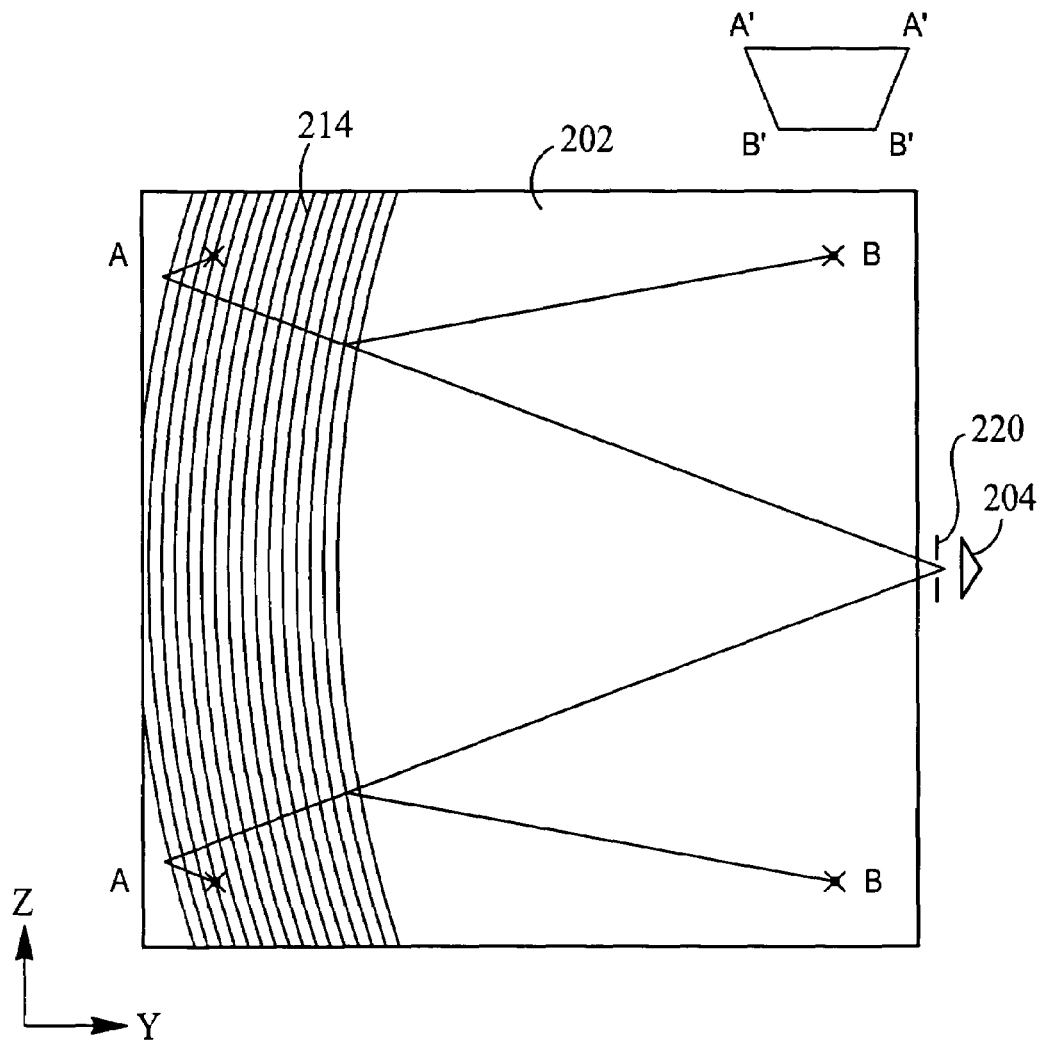

When the angle $\phi_Y$ (as indicated by reference number 1600 in FIG. 16) is such that the image A'B' is tilted in a manner such that the segment A'O is greater than the segment B'O, then residual perspective distortions arise, but have an opposite direction to those of FIGS. 14 and 15). To compensate for these distortions, the microreflectors 214 are designed in a convex arrangement relative to the imaging lens, as shown in FIG. 14.

What is claimed is:

1. A device for creating an image of a fingerprint pattern on an image sensor, the device comprising:
    an optical plate including:
        a finger field to which a finger is pressed to create the fingerprint pattern, and
        an array of microreflectors covering part of the optical plate, the microreflectors being distributed along a base surface;
    an illuminating tool that illuminates the finger field to create imaging light rays relating to the fingerprint pattern; and
    an imaging lens to receive the imaging light rays reflected from the array of microreflectors to create the fingerprint pattern image at a location external to the optical plate, the imaging lens including an aperture stop that defines an aperture light beam of the reflected imaging light rays forming the image of the fingerprint pattern;
    in which the microreflectors are inclined to the base surface so that an area of a projection of the microreflectors on the base surface taken along a path of the imaging light rays reflected at the surface of the microreflectors and passing through the aperture stop exceeds an area of a projection of the microreflectors on the base surface taken along a path of the reflected imaging light rays incident to the surface of the microreflectors.

2. The device of claim 1 in which the projection area of the microreflectors to the base surface, along the path of the reflected imaging light rays, covers uninterruptedly the base surface.

3. The device of claim 1 in which a slope of a microreflector, relative to the base surface, varies with a position of the microreflector at the base surface.

4. The device of claim 1 in which a coherence interval of light radiated from the illuminating tool is less than the optical path length difference between reflected imaging light rays from different microreflectors.

5. The device of claim 1 in which the illuminating tool illuminates the finger field from two opposite sides.

6. The device of claim 1 in which the base surface is positioned such that a difference of distances to the finger field from an edge of the base surface farthest from the finger field and an edge of the base surface nearest to the finger field ranges from about 30 to about 50 percent of the distance between the edges.

7. The device of claim 1 in which an edge of the base surface farthest from the finger field is nearest to the imaging lens.

8. The device of claim 7 in which the microreflectors are formed of V-shaped grooves, the open ends of which face the imaging lens.

9. The device of claim 8 in which the period of the microreflectors is varied based on a cross-section of the aperture light beam such that a resolution of the device remains substantially constant.

10. The device of claim 9 in which the period of spacing ranges from about 1.5 to about 5.

11. The device of claim 7 in which the V-shaped grooves are in a concave arrangement relative to the imaging lens.

12. The device of claim 7 in which the V-shaped grooves are in a convex arrangement relative to the imaging lens.

13. The device of claim 7 in which the microreflectors are planar.

14. The device of claim 1 in which the base surface is inclined to the finger field by an angle that ranges from about 20 to about 30 degrees.

15. An electronic apparatus comprising:
    a device to create an image of a fingerprint pattern on an image sensor, the device comprising:
        an optical plate including:
            a finger field to which a finger is pressed to create the fingerprint pattern, and
            an array of microreflectors covering part of the optical plate, the microreflectors being distributed along a base surface;
        an illuminating tool that illuminates the finger field to create imaging light rays relating to the fingerprint pattern;
        an imaging lens to receive the imaging light rays reflected from the array of microreflectors to create the fingerprint pattern image at a location external to the optical plate, the imaging lens including an aperture stop that defines an aperture light beam of the reflected imaging light rays forming the image of the fingerprint pattern;
        in which the microreflectors are inclined to the base surface so that an area of a projection of the microreflectors on the base surface taken along a path of the reflected imaging light rays and passing through the center of the aperture stop exceeds an area of a projection of the microreflectors on the base surface taken along a path of the imaging light rays incident to the surface of the microreflectors; and a housing shaped to hold electronic components for operation of the electronic apparatus and shaped to retain the device, the housing including an outer surface;

in which the finger field lies flush with the outer surface of the housing when the device is retained by the housing.

16. The apparatus of claim 15 in which the device includes a step that permits the housing to retain the device.

17. The apparatus of claim 16 in which the housing includes a recess and the device includes a tab that fits into the housing recess to retain the device.

18. A device for creating an image of a fingerprint pattern on an image sensor, the device comprising:

an optical plate including:
a finger field to which a finger is pressed to create the fingerprint pattern, and
an array of microreflectors covering part of the optical plate, the microreflectors being distributed along a base surface;

an illuminating tool that illuminates the finger field to create imaging light rays relating to the fingerprint pattern; and an imaging lens to receive the imaging light rays reflected from the array of microreflectors to create the fingerprint pattern image at a location external to the optical plate, the imaging lens including an aperture stop that defines an aperture light beam of the reflected imaging light rays forming the image of the fingerprint pattern;

in which the microreflectors are inclined to the base surface so that an angle between the normal to the base surface and an imaging light ray incident to a microreflector is less than an angle between the normal to the base surface and that imaging light ray reflected from the microreflector.

19. A device for creating an image of a fingerprint pattern on an image sensor, the device comprising:

an optical plate including:
a finger field to which a finger is pressed to create the fingerprint pattern, and
an array of microreflectors covering part of the optical plate, the microreflectors being distributed along a base surface and being shaped like V-shaped grooves;

an illuminating tool that illuminates the finger field to create imaging light rays relating to the fingerprint pattern; and an imaging lens to receive the imaging light rays reflected from the array of microreflectors to create the fingerprint pattern image at a location external to the optical plate, the imaging lens including an aperture stop that defines an aperture light beam of the reflected imaging light rays forming the image of the fingerprint pattern;

wherein the side of the grooves facing the imaging lens receives and reflects the imaging light rays that define the aperture light beam.

20. An electronic apparatus comprising:

a device for creating an image of a fingerprint pattern on an image sensor, the device comprising:

an optical plate including:
a finger field to which a finger is pressed to create the fingerprint pattern, and
an array of microreflectors covering part of the optical plate, the microreflectors being distributed along a base surface;

an illuminating tool that illuminates the finger field to create imaging light rays relating to the fingerprint pattern;

an imaging lens to receive the imaging light rays reflected from the array of microreflectors to create the fingerprint pattern image at a location external to the optical plate, the imaging lens including an aperture stop that defines an aperture light beam of the reflected imaging light rays forming the image of the fingerprint pattern;

in which the microreflectors are inclined to the base surface so that an area of a projection of the microreflectors on the base surface taken along a path of the reflected imaging light rays and passing through the aperture stop exceeds an area of a projection of the microreflectors on the base surface taken along a path of the imaging light rays incident to the surface of the microreflectors; and a housing shaped to hold electronic components for operation of the electronic apparatus and shaped to retain the device;

in which the optical plate operates simultaneously as an indicator surface of the housing and as a finger field.

21. A device for creating an image of a fingerprint pattern on an image sensor, the device comprising:

an optical plate including:
a finger field to which a finger is pressed to create the fingerprint pattern,
an array of microreflectors covering part of the optical plate, the microreflectors being distributed along a base surface, an illuminating tool that illuminates the finger field to create imaging light rays relating to the fingerprint pattern; and an imaging lens receiving the imaging light rays reflected from the array of microreflectors to create the fingerprint pattern image at a location external to the optical plate, the imaging lens including an aperture stop that defines an aperture light beam of the reflected imaging light rays forming the image of the fingerprint pattern;

in which the microreflectors are inclined to the base surface so that a cross-section of image light rays incident to the microreflectors is discontinuously greater than a cross-section of the imaging light rays reflected from the microreflector.

* * * * *